US011741021B2

(12) United States Patent
Venkatesan et al.

(10) Patent No.: US 11,741,021 B2
(45) Date of Patent: Aug. 29, 2023

(54) TRUST DOMAINS FOR PERIPHERAL DEVICES (71) Applicant: VMware, Inc., Palo Alto, CA (US)

(72) Inventors: Srihari Venkatesan, San Francisco, CA (US); Sunil Kotian, San Jose, CA (US); Andrei Warkentin, South Elgin, IL (US); Kalaiselvi Sengottuvel, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/577,584

(22) Filed: Jan. 18, 2022

(65) Prior Publication Data

US 2023/0229602 A1 Jul. 20, 2023

(51) Int. Cl.
*G06F 12/00* (2006.01)
*G06F 12/14* (2006.01)
*G06F 12/109* (2016.01)
*G06F 13/42* (2006.01)
*G06F 9/455* (2018.01)
*G06F 12/02* (2006.01)

(52) U.S. Cl.
CPC ........ *G06F 12/145* (2013.01); *G06F 9/45558* (2013.01); *G06F 12/0238* (2013.01); *G06F 12/109* (2013.01); *G06F 12/1433* (2013.01); *G06F 13/4221* (2013.01); *G06F 2009/45583* (2013.01); *G06F 2009/45587* (2013.01)

(58) Field of Classification Search
CPC ............... G06F 12/145; G06F 9/45558; G06F 12/0238; G06F 12/109; G06F 12/1433; G06F 13/4221; G06F 2009/45583; G06F 2009/45587
See application file for complete search history.

(56) References Cited

U.S. PATENT DOCUMENTS

| 10,911,292 B1* | 2/2021 | Bshara ..................... H04L 41/12 |
| 2017/0017609 A1* | 1/2017 | Menachem ......... G06F 13/4022 |
| 2020/0042463 A1* | 2/2020 | Thomas ................ H04L 63/102 |
| 2022/0405212 A1* | 12/2022 | Kakaiya ................ G06F 12/145 |

\* cited by examiner

*Primary Examiner* — Arvind Talukdar
(74) *Attorney, Agent, or Firm* — Thomas Horstemeyer, LLP (57) ABSTRACT Disclosed are various embodiments for various approaches for implementing trust domains to provide boundaries between PCIe devices connected to the same PCIe switch. A first trust identifier can be assigned to a first virtual machine hosted by the computing device. The first trust identifier can also be assigned to a first PCIe device assigned to the first virtual machine. Later, it can be determined that a second PCIe device connected to the PCIe switch is assigned a second trust identifier assigned to a second virtual machine. An Address Control Services (ACS) direct translated bit for peer-to-peer memory requests in the PCIe switch can be disabled in response to a determination that the second PCIe device is associated with the second trust identifier assigned to the second virtual machine.

20 Claims, 7 Drawing Sheets

TRUST DOMAINS FOR PERIPHERAL DEVICES

BACKGROUND

Modern computer systems use virtualization to run multiple virtual machines (VMs) on a host operating system. The virtual machines are often given control over devices installed on the host machine through Peripheral Component Interconnect Express (PCIe) passthrough to allow for higher performance. In these situations, it is common for PCIe devices to request Address Translation Services (ATS) from a translation agent like an Input/Output Memory Management Unit (IOMMU) and cache the translated addresses in the PCIe device's Address Translation Cache (ATC). It is also common for downstream PCIe switches to have Address Control Services (ACS) enabled to allow for direct routing of peer-to-peer Translated Memory Requests coming from one or more ATC capable PCIe devices. However, on systems using ATS, a security vulnerability is exposed when using ACS for peer-to-peer transactions because PCIe transaction layer packets (TLPs) are not sent to the IOMMU to evaluate whether the requesting device has permission to read from or write to the memory of the peer device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for implementing trust domains to provide boundaries between PCIe devices connected to the same PCIe switch. The trust domains allow for a hypervisor to enable or disable direct routing of peer-to-peer Translated Memory Requests between PCIe devices connected to the same PCIe switch in the event that multiple virtual machines have been assigned PCIe devices connected to the same PCIe switch. This prevents a PCIe device assigned to a first virtual machine from accessing the memory allocated to a second PCIe device assigned to a second virtual machine. As a result, the security of the hypervisor and the virtual machines executing on the host machine is improved by preventing side-channel attacks whereby a malicious device or virtual machine could access the data of a second virtual machine.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
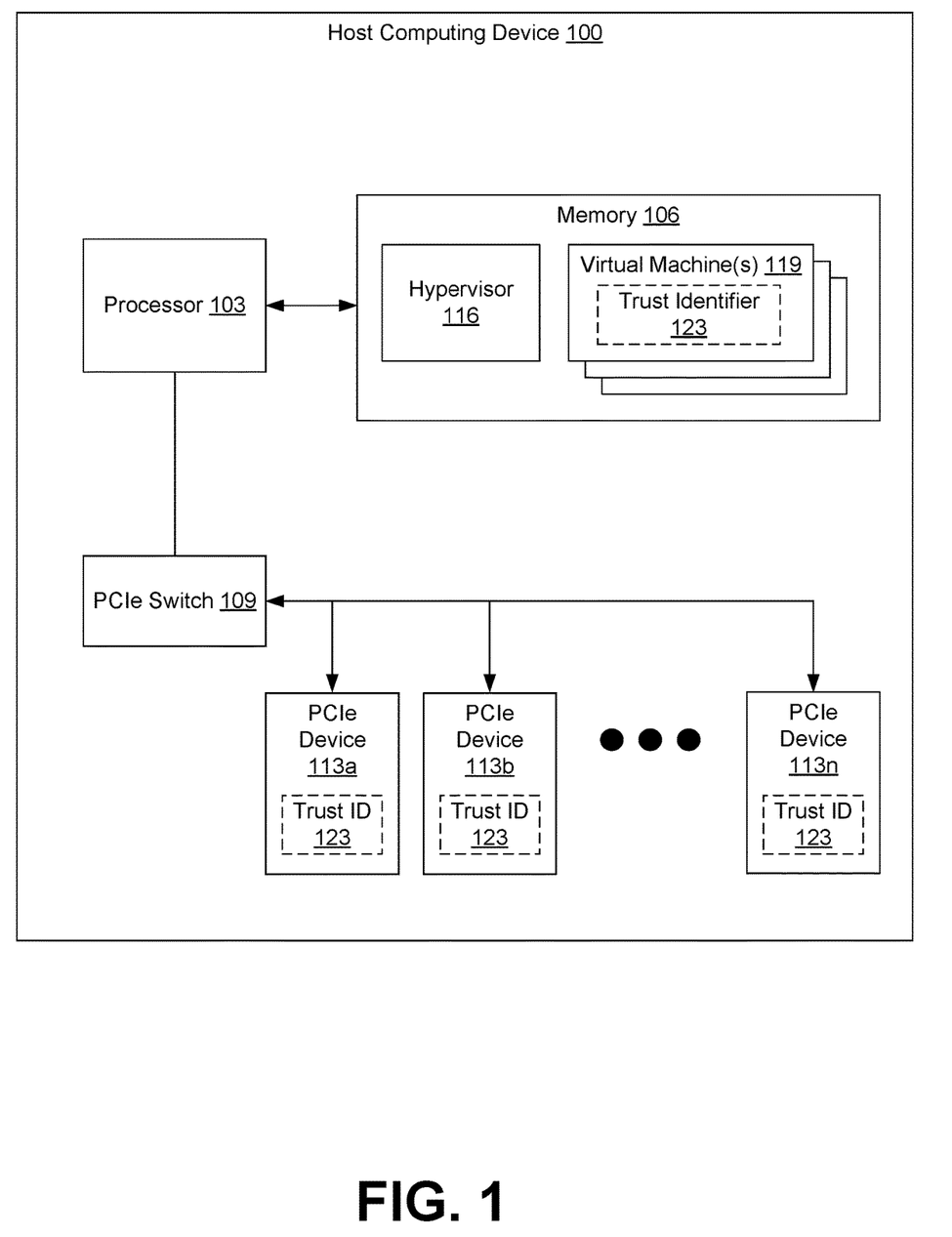
FIG. 1 is a drawing of a host computing device according to various embodiments of the present disclosure.

As illustrated in FIG. 1, shown is a schematic block diagram of a host computing device 100 according to various embodiments of the present disclosure. The host computing device 100 can include a processor 103, memory 106, a PCIe switch 109, and one more PCIe devices 113a-n (collectively "PCIe devices 113" and generically "PCIe device 113"). The PCIe devices 113 can be attached to the PCIe switch 109, allowing for multiple PCIe devices 113 to share a limited number of PCIe lanes between the processor 103 and the PCIe switch 109.

The PCIe switch 109 can be used to expand the number of PCIe lanes that are available from the processor 103, thereby allowing for additional PCIe devices 113 to be installed in the host computing device 100 and connected to the processor 103. In general, a PCIe switch 109 can have at least one upstream connection that connects to the processor 103 or another PCIe switch 109, and multiple downstream connections which allow for additional PCIe devices 113 or PCIe switches 109 to be connected to the PCIe switch. As a result, the upstream connection can be split or shared among the devices connected to the downstream connections.

The PCIe switch 109 can also provide additional services to improve the performance of PCIe devices 113. For example, individual PCIe devices 113 could include an Address Translation Cache (ATC) to cache translated addresses received from the IOMMU of the processor 103, allowing PCIe devices 113 to learn and/or remember the physical addresses of other PCIe devices 113. As a result, when a PCIe device 113a sends data to or reads data from the virtual memory address mapped to another PCIe device 113b, the PCIe device 113a could send data directly to or read data directly from the PCIe device 113b without the overhead of the IOMMU translating the guest virtual addresses or guest physical addresses to physical addresses of the host computing device 100. To improve the performance of direct memory accesses between PCIe devices 113, the PCIe switch 109 could therefore provide Address Control Services (ACS), which allow for ATC capable PCIe devices 113 connected to the same PCIe switch 109 to directly route communications to each other. Because of the potential security risks inherent in direct memory access and direct memory routing between PCIe devices 113, the PCIe switch 109 can also provide an ACS direct translated bit that can be set to enable or disable ACS for the PCIe switch 109.

The host computing device 100 can also execute a hypervisor 116, which includes machine-readable instructions stored in the memory 106 that, when executed by the processor 103 of the host computing device 100, cause the host computing device 100 to host one or more virtual machines 119.

The hypervisor 116, which may sometimes be referred to as a virtual machine monitor (VMM), is an application or software stack that allows for creating and running virtual machines 119. Accordingly, a hypervisor 116 can be configured to provide guest operating systems with a virtual operating platform, including virtualized hardware devices or resources, and manage the execution of guest operating systems within a virtual machine execution space provided by the hypervisor 116. In some instances, a hypervisor 116 may be configured to run directly on the hardware of the host computing device 100 in order to control and manage the hardware resources of the host computing device 100 provided to the virtual machines 119 resident on the host computing device 100. In other instances, the hypervisor 116 an be implemented as an application executed by an operating system executed by the host computing device 100, in which case the virtual machines 119 may run as a thread, task, or process of the hypervisor 116 or operating system. Examples of different types of hypervisors 116 include ORACLE VM SERVER™, MICROSOFT HYPER-V®, VMWARE ESX™ and VMWARE ESXi™, VMWARE WORKSTATION™, VMWARE PLAYER™ and ORACLE VIRTUALBOX®.

The hypervisor 116 can cause one or more processes, threads, or subroutines to execute in order to provide an appropriate level of functionality to individual virtual machines 119. For example, some instances of a hypervisor 116 could spawn individual host processes to manage the execution of respective virtual machines 119. In other instances, however, the hypervisor 116 could manage the execution of all virtual machines 119 hosted by the hypervisor 116 using a single process.

The virtual machines 119 can represent software emulations of computer systems. Accordingly, a virtual machine 119 can provide the functionality of a physical computer sufficient to allow for installation and execution of an entire operating system and any applications that are supported or executable by the operating system. As a result, a virtual machine 119 can be used as a substitute for a physical machine to execute one or more processes.

In order to more efficiently operate, or operate with higher performance, one or more of the PCIe devices 113 installed on the host computing device 100 can be made available to the virtual machines 119 by the hypervisor 116. In some implementations, the resources of a PCIe device 113 could be shared between multiple virtual machines 119, such as when network traffic associated with multiple virtual machines 119 is sent or received through a single network interface card (NIC). In other implementations, the a PCIe device 113 could be assigned to a virtual machine 119 for exclusive use by that virtual machine 119, in which case the PCIe device 113 may be referred to as operating in PCIe passthrough mode.

To establish access boundaries between PCIe devices 113 and virtual machines 119, trust identifiers 123 can be used. Each virtual machine 119 can be assigned a trust identifier 123, which can represent a trusted domain in which members are allowed to communicate with each other. For example, a trust identifier 123 could be assigned to a single virtual machine 119 and multiple PCIe devices 113, which would indicate that the PCIe devices 113 can only communicate with the single virtual machine 119 and with each other. This could be done, for example, to prevent PCIe devices 113 from communicating with each other through direct memory accesses and/or prevent another virtual machine 119 with a different trust identifier 123 from communicating with the PCIe devices 113.

A default trust identifier 123 can be assigned to virtual machines 119 and/or PCIe devices 113. The default trust identifier 123 can be used to indicate that a virtual machine 119 or a PCIe device 113 has been unassigned to a trusted domain represented by a unique or assigned trust identifier 123. Alternatively, the default trust identifier 123 could be used to represent that a PCIe device 113 is currently not allocated to a virtual machine 119 for operation in PCIe passthrough mode.

Next, a general description of the operation of the various components of the host computing device 100 is provided. Although the following general description illustrates the general principles of the present disclosure, additional detail and alternative embodiments are set forth in the discussion of FIGS. 2-7.

To begin, the hypervisor 116 can configure a virtual machine 119 with a unique trust identifier 123. The unique trust identifier 123 can be used to uniquely identify the virtual machine 119 with respect to other virtual machines 119 for the purposes of communicating with PCIe devices 113 that are operating in PCIe passthrough mode. The hypervisor 116 can then assign the trust identifier 123 to each of the PCIe devices 113 that are allocated or assigned to the virtual machine 119 for operation in PCIe passthrough mode.

To prevent the PCIe devices 113 assigned to the first virtual machine 119 from being able to communicate with PCIe devices 113 assigned to other virtual machines 119, the hypervisor 116 can evaluate or analyze the trust identifiers 123 of the PCIe devices 113 connected to the PCIe switch 109. If the remaining PCIe devices 113 connected to the PCIe switch 109 have either the same trust identifier 123 as the trust identifier 123 assigned to the first virtual machine 119 or the default trust identifier 123, then the hypervisor 116 could determine that none of the remaining PCIe devices 113 connected to the PCIe switch 109 are assigned to other virtual machines 119. In this case, the hypervisor 116 could set the ACS direct translated bit to enable ACS on the PCIe switch 109 to permit PCIe devices 113 connected to the PCIe switch 109 to communicate directly with each other. However, if one or more of the PCIe devices 113 connected to the PCIe switch 109 have been assigned a second trust identifier 123 assigned to a second virtual machine 119, then the hypervisor 116 could set the ACS direct translated bit to disable ACS on the PCIe switch 109 to prevent direct communication between the PCIe devices 113 connected to the PCIe switch 109.

The hypervisor 116 could perform this process on several occasions. For example, this process could be performed when a virtual machine 119 configured with one or more PCIe devices 113 in passthrough mode is powered on. As another example, this process could be performed when a PCIe device 113 is hot added to a virtual machine 119.

Similar processes could be performed by the hypervisor 116 when a virtual machine 119 is powered off and/or a PCIe device 113 is hot removed from a virtual machine 119. In these situations, the trust identifier 123 of the PCIe device(s) 113 is set to the default trust identifier 123. The hypervisor 116 could then evaluate whether the PCIe devices 113 connected to the PCIe switch 109 have either the same trust identifier 123 or the default trust identifier 123. If the PCIe devices 113 have either the same trust identifier 123 or the default trust identifier 123, the hypervisor 116 could set the ACS direct translated bit to enable ACS on the PCIe switch 109 to permit PCIe devices 113 connected to the PCIe switch 109 to communicate directly with each other. Otherwise, the hypervisor 116 could set the ACS direct translated bit to disable ACS on the PCIe switch 109 to prevent direct communication between the PCIe devices 113 connected to the PCIe switch 109.

Figure 2:
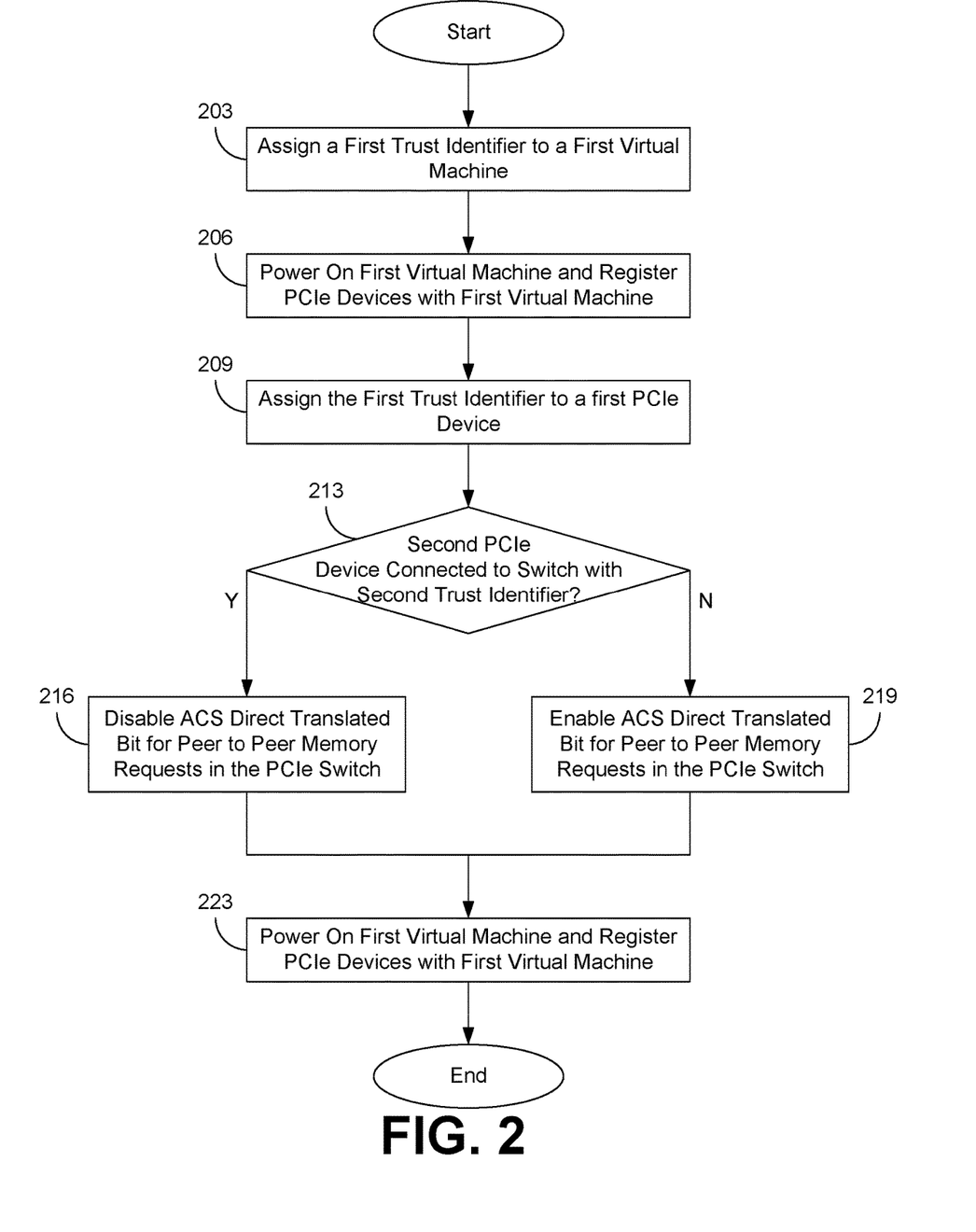
FIGS. 2-7 are flowcharts illustrating examples of functionality implemented as portions of a hypervisor executed in the host computing device of FIG. 1 according to various embodiments of the present disclosure.

Referring next to FIG. 2, shown is a flowchart that provides one example of the operation of a portion of the hypervisor 116. The flowchart of FIG. 2 provides merely an example of the many different types of functional arrangements that can be employed to implement the operation of the depicted portion of the hypervisor 116. As an alternative, the flowchart of FIG. 2 can be viewed as depicting an example of elements of a method implemented within the host computing device 100.

Beginning with block 203, the hypervisor 116 can assign a first trust identifier 123 to a first virtual machine 119. In some implementations, the hypervisor 116 could assign a trust identifier 123 sequentially (e.g., by using the next available, unused number). In other implementations, the hypervisor 116 could generate a random number or value to represent the trust identifier 123. The trust identifier 123 is then assigned to the virtual machine 119.

Then, at block 206, the hypervisor 116 can begin powering on the first virtual machine 119. As part of the power on process, the hypervisor 116 can register one or more PCIe devices 113 with the first virtual machine 119. As part of the registration process, the PCIe devices 113 can be configured to operate with the first virtual machine 119 in PCIe passthrough mode.

Next, at block 209, the hypervisor 116 can assign the first trust identifier 123 that was assigned to the first virtual machine 119 at block 203 to the PCIe devices 113 registered with the first virtual machine 119 at block 206.

Moving on to block 213, the hypervisor 116 can then evaluate or otherwise determine whether a second PCIe device 113 connected to the same PCIe switch 109 has been assigned to a second trust identifier 123 associated with a second virtual machine 119. If a second PCIe device 113 with a second trust identifier 123 is connected to the same PCIe switch 109 as a first PCIe device 113 with the first trust identifier 123, then the hypervisor 116 can determine that multiple virtual machines 119 have been assigned PCIe devices 113 operating in PCIe passthrough mode that are connected to the same PCIe switch 109. Accordingly, the process can proceed to block 216. However, if the hypervisor 116 determines that all of the PCIe devices 113 connected to the PCIe switch 109 have been assigned the same trust identifier 123 as the trust identifier 123 assigned to the first PCIe device 113 at block 209, or have been assigned the default trust identifier 123, then the hypervisor 116 could determine that the PCIe devices 113 connected to the PCIe switch 109 are all registered with the same virtual machine 119. In these situations, the process can proceed to block 219.

If the process proceeds to block 216, the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 223.

However, if the process proceeds to block 219, the hypervisor 116 can set the ACS direct translated bit of the PCIe switch 109 to an enabled state to enable or allow direct communication between PCIe devices 113 connected to the PCIe switch 109. If the ACS direct translated bit of the PCIe switch 109 is already enabled (e.g., because it was previously enabled by the hypervisor 116), then the hypervisor 116 could proceed directly to block 223.

Then, at block 223, the hypervisor 116 can complete the power on process of the first virtual machine 119 and complete the registration of the PCIe devices 113 with the first virtual machine 119.

Figure 3:
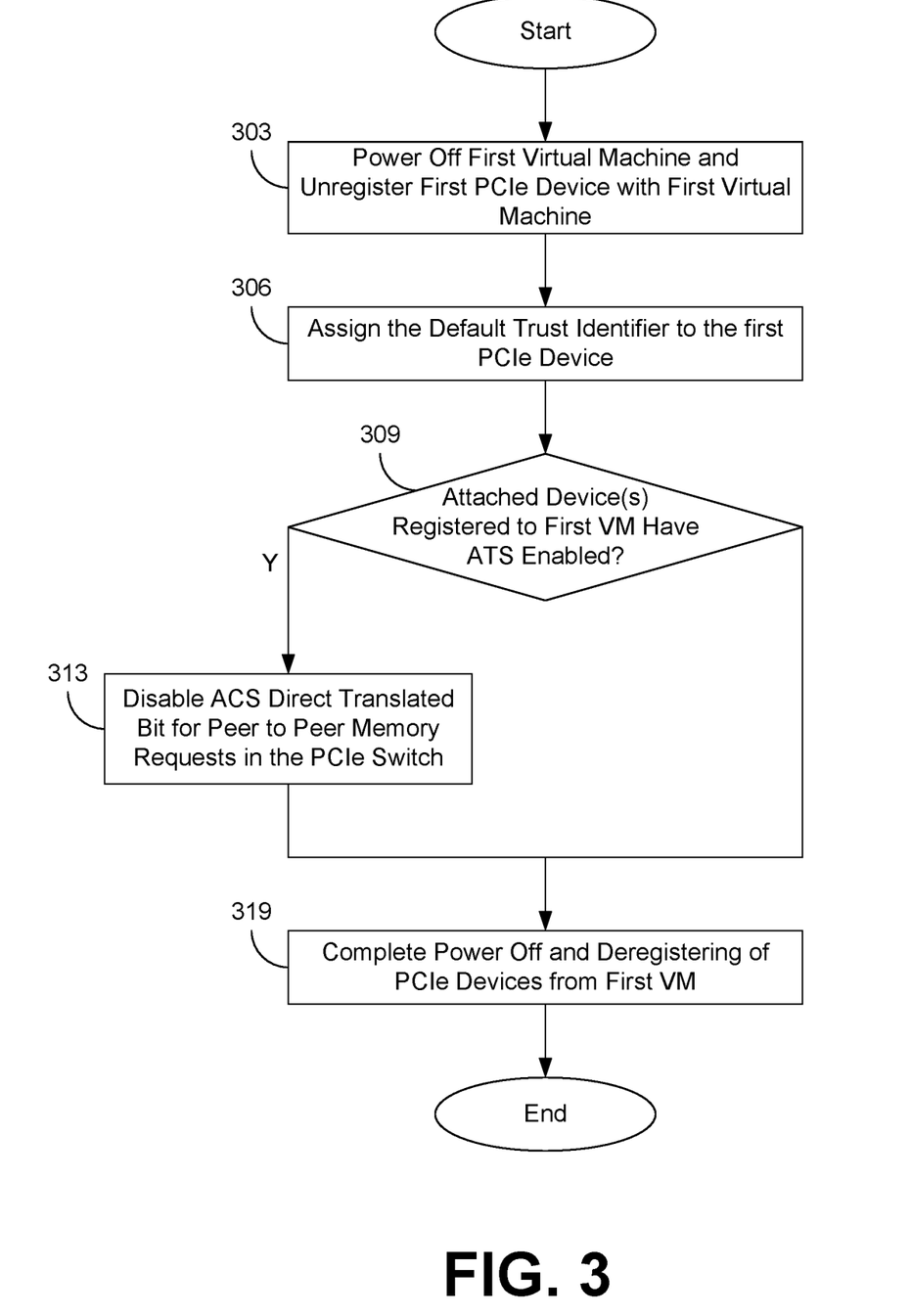

Referring next to FIG. 3, shown is a flowchart that provides one example of the operation of a portion of the hypervisor 116. The flowchart of FIG. 3 provides merely an example of the many different types of functional arrangements that can be employed to implement the operation of the depicted portion of the hypervisor 116. As an alternative, the flowchart of FIG. 3 can be viewed as depicting an example of elements of a method implemented within the host computing device 100.

Beginning with block 303, the hypervisor 116 can begin the power off process for the first virtual machine 119. This can include unregistering or otherwise removing an association between the first virtual machine 119 and any PCIe devices 113 registered to the first virtual machine 119, such as PCIe devices 113 assigned to the first virtual machine 119 that are operating in passthrough mode.

Proceeding to block 306, the hypervisor 116 can assign a default trust identifier 123 to each of the PCIe devices 113. The default trust identifier 123 can serve to indicate that the PCIe devices 113 are no longer assigned to the first virtual machine 119 or in the same trust domain as the first virtual machine 119.

Then, at block 309, the hypervisor 116 can query the PCIe devices 113 that were registered to the first virtual machine 119 to determine whether any of the PCIe have Address Translation Services (ATS) enabled. If any of the PCIe devices 113 have ATS enabled, as indicated by an ATS bit, then the process can proceed to block 313. However, if none of the PCI devices 113 have ATS enabled, then the process can instead proceed to block 319.

If the process proceeds to block 313, then the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 319.

Subsequently, at block 319, they hypervisor 116 can complete the power off process for the first virtual machine 119. As part of the power off process, the hypervisor 116 can finish unregistering the PCIe device 113.

Figure 4:
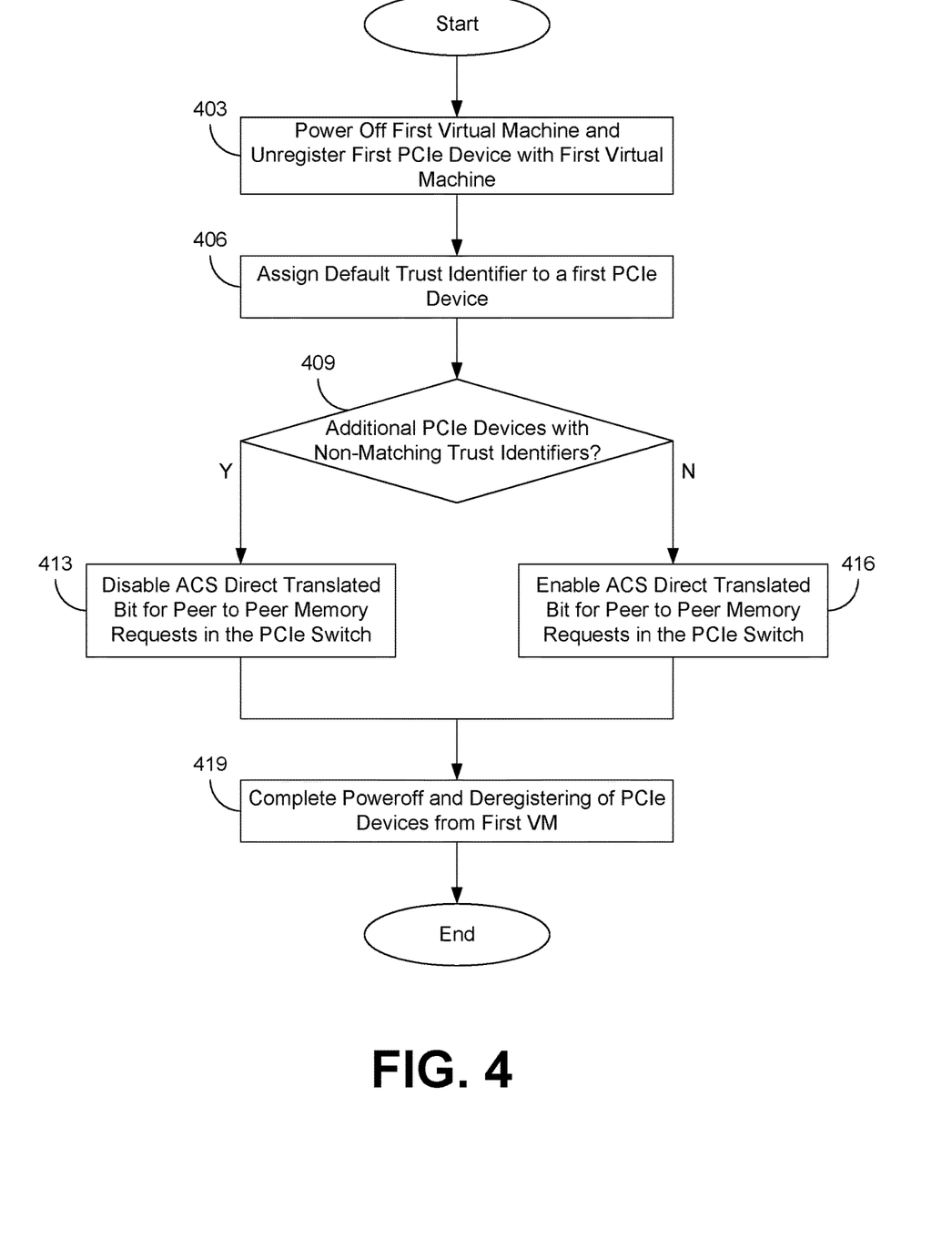

Referring next to FIG. 4, shown is a flowchart that provides one example of the operation of a portion of the hypervisor 116. The flowchart of FIG. 4 provides merely an example of the many different types of functional arrangements that can be employed to implement the operation of the depicted portion of the hypervisor 116. As an alternative, the flowchart of FIG. 4 can be viewed as depicting an example of elements of a method implemented within the host computing device 100.

Beginning with block 403, the hypervisor 116 can begin the power off process for the first virtual machine 119. This can include unregistering or otherwise removing an association between the first virtual machine 119 and any PCIe devices 113 registered to the first virtual machine 119, such as PCIe devices 113 assigned to the first virtual machine 119 that are operating in passthrough mode.

Moving to block 406, the hypervisor 116 can assign a default trust identifier 123 to each of the PCIe devices 113. The default trust identifier 123 can serve to indicate that the PCIe devices 113 are no longer assigned to the first virtual machine 119 or in the same trust domain as the first virtual machine 119.

Then, at block 409, the hypervisor 116 can evaluate the remaining PCIe devices 113 attached to the PCIe switch 109. If any of the remaining PCIe devices 113 connected to the PCIe switch 109 have been assigned different trust identifiers 123 associated with separate virtual machines 119 (e.g., a second PCIe device 113 being assigned a second trust identifier 123 and a third PCIe device 113 being assigned a third trust identifier 123), then this can indicate that there are PCIe devices 113 assigned to different virtual machines 119 connected to the PCIe switch 109. In this situation, the process would proceed to block 413. However, if the remaining PCIe devices 113 connected to the PCIe switch 109 have been assigned to the same trust identifier 123 and/or the default trust identifier 123, then this can indicate that the PCIe devices connect to the PCIe switch 109 are part of the same trusted domain and/or are assigned to the same virtual machine 119. In this situation, the process could proceed to block 416.

If the process proceeds to block 413, then the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 319.

However, if the process proceeds to block 416, then the hypervisor 116 can set the ACS direct translated bit of the PCIe switch 109 to an enabled state to enable or allow direct communication between PCIe devices 113 connected to the PCIe switch 109. If the ACS direct translated bit of the PCIe switch 109 is already enabled (e.g., because it was previously enabled by the hypervisor 116), then the hypervisor 116 could proceed directly to block 419.

Subsequently, at block 419, they hypervisor 116 can complete the power off process for the first virtual machine 119. As part of the power off process, the hypervisor 116 can finish unregistering the PCIe device 113.

Figure 5:
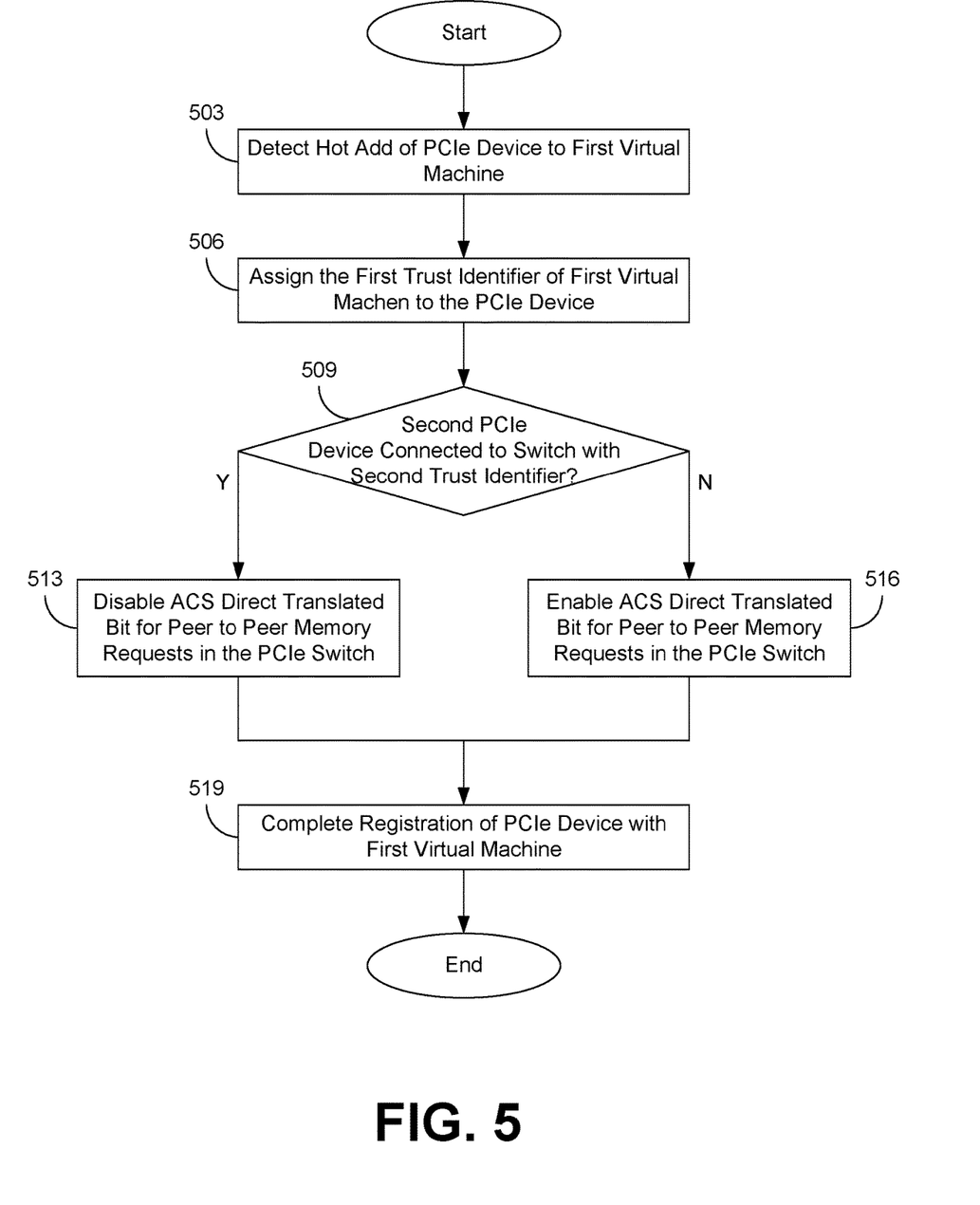

Referring next to FIG. 5, shown is a flowchart that provides one example of the operation of a portion of the hypervisor 116. The flowchart of FIG. 5 provides merely an example of the many different types of functional arrangements that can be employed to implement the operation of the depicted portion of the hypervisor 116. As an alternative, the flowchart of FIG. 5 can be viewed as depicting an example of elements of a method implemented within the host computing device 100.

Beginning with block 503, the hypervisor 116 can detect that a PCIe device 113 has been hot added to a first virtual machine 119. In this context, a PCIe device 113 is hot added when the PCIe device 113 is added to the first virtual machine 119 while the first virtual machine 119 is executing and the PCIe device 113 is subsequently usable without having to power cycle the first virtual machine 119. This is in contrast to cold adding a PCIe device 113 to the first virtual machine 119, where the first virtual machine 119 has to be powered off to add the PCIe device 113 to the configuration of the first virtual machine 119 and is not usable until the first virtual machine 119 is powered on.

Then, at block 506, the hypervisor 116 can assign the first trust identifier 123 that is assigned to the first virtual machine 119 to the PCIe devices 113 that were hot added to the first virtual machine 119.

Moving on to block 509, the hypervisor 116 can then evaluate or otherwise determine whether a second PCIe device 113 connected to the same PCIe switch 109 has been assigned to a second trust identifier 123 associated with a second virtual machine 119. If a second PCIe device 113 with a second trust identifier 123 is connected to the same PCIe switch 109 as a first PCIe device 113 with the first trust identifier 123, then the hypervisor 116 can determine that multiple virtual machines 119 have been assigned PCIe devices 113 operating in PCIe passthrough mode that are connected to the same PCIe switch 109. Accordingly, the process can proceed to block 513. However, if the hypervisor 116 determines that all of the PCIe devices 113 connected to the PCIe switch 109 have been assigned the same trust identifier 123 as the trust identifier 123 assigned to the first PCIe device 113 at block 506, or have been assigned the default trust identifier 123, then the hypervisor 116 could determine that the PCIe devices 113 connected to the PCIe switch 109 are all registered with the same virtual machine 119. In these situations, the process can proceed to block 516.

If the process proceeds to block 513, the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 519.

However, if the process proceeds to block 516, the hypervisor 116 can set the ACS direct translated bit of the PCIe switch 109 to an enabled state to enable or allow direct communication between PCIe devices 113 connected to the PCIe switch 109. If the ACS direct translated bit of the PCIe switch 109 is already enabled (e.g., because it was previously enabled by the hypervisor 116), then the hypervisor 116 could proceed directly to block 519.

Then, at block 519, the hypervisor 116 can complete the registration of the PCIe device 113 with the first virtual machine 119.

Figure 6:
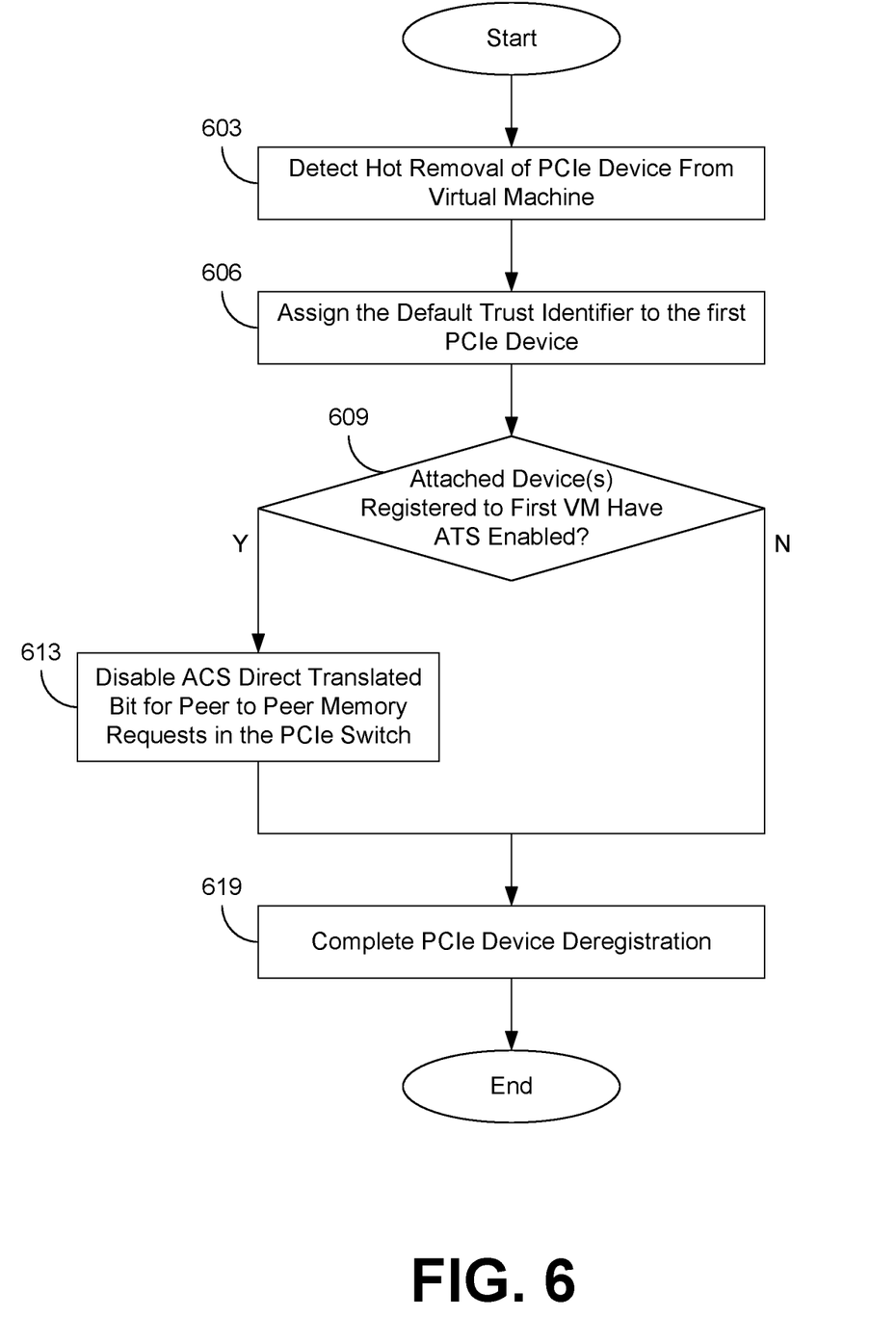

Referring next to FIG. 6, shown is a flowchart that provides one example of the operation of a portion of the hypervisor 116. The flowchart of FIG. 6 provides merely an example of the many different types of functional arrangements that can be employed to implement the operation of the depicted portion of the hypervisor 116. As an alternative, the flowchart of FIG. 6 can be viewed as depicting an example of elements of a method implemented within the host computing device 100.

Beginning with block 603, the hypervisor 116 can detect that a PCIe device 113 has been hot removed from a first virtual machine 119. In this context, a PCIe device 113 is hot removed when the PCIe device 113 is removed from the first virtual machine 119 while the first virtual machine 119 is executing the first virtual machine 119 remains usable without having to power cycle the first virtual machine 119. This is in contrast to cold removal of a PCIe device 113 from the first virtual machine 119, where the first virtual machine 119 has to be powered off to remove the PCIe device 113 from the configuration of the first virtual machine 119 and the first virtual machine is not usable until the first virtual machine 119 is powered back on.

Proceeding to block 606, the hypervisor 116 can assign a default trust identifier 123 to each of the PCIe devices 113. The default trust identifier 123 can serve to indicate that the PCIe devices 113 are no longer assigned to the first virtual machine 119 or in the same trust domain as the first virtual machine 119.

Then, at block 609, the hypervisor 116 can query the PCIe devices 113 that were registered to the first virtual machine 119 to determine whether any of the PCIe have Address Translation Services (ATS) enabled. If any of the PCIe devices 113 have ATS enabled, as indicated by an ATS bit, then the process can proceed to block 313. However, if none of the PCI devices 113 have ATS enabled, then the process can instead proceed to block 619.

If the process proceeds to block 613, then the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 619.

Subsequently, at block 619, the hypervisor 116 can complete the deregistration process of the PCIe device 113 that was hot removed from the virtual machine 119.

Figure 7:
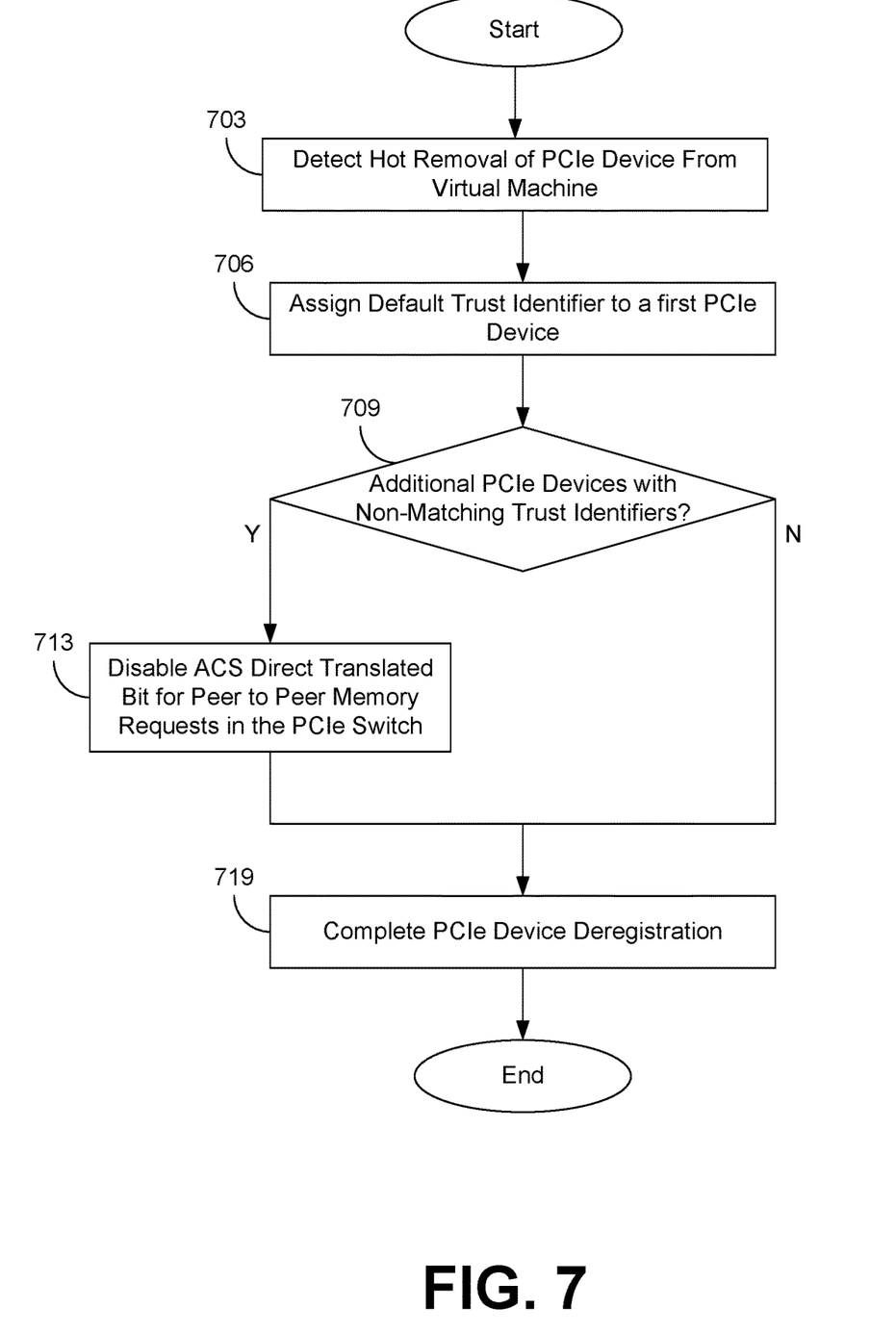

Referring next to FIG. 7, shown is a flowchart that provides one example of the operation of a portion of the hypervisor 116. The flowchart of FIG. 7 provides merely an example of the many different types of functional arrangements that can be employed to implement the operation of the depicted portion of the hypervisor 116. As an alternative, the flowchart of FIG. 7 can be viewed as depicting an example of elements of a method implemented within the host computing device 100.

Beginning with block 703 the hypervisor 116 can detect that a PCIe device 113 has been hot removed from a first virtual machine 119. In this context, a PCIe device 113 is hot removed when the PCIe device 113 is removed from the first virtual machine 119 while the first virtual machine 119 is executing the first virtual machine 119 remains usable without having to power cycle the first virtual machine 119. This is in contrast to cold removal of a PCIe device 113 from the first virtual machine 119, where the first virtual machine 119 has to be powered off to remove the PCIe device 113 from the configuration of the first virtual machine 119 and the first virtual machine is not usable until the first virtual machine 119 is powered back on.

Proceeding to block 706, the hypervisor 116 can assign a default trust identifier 123 to each of the PCIe devices 113. The default trust identifier 123 can serve to indicate that the PCIe devices 113 are no longer assigned to the first virtual machine 119 or in the same trust domain as the first virtual machine 119.

Moving on to block 709, the hypervisor 116 can evaluate the remaining PCIe devices 113 attached to the PCIe switch 109. If any of the remaining PCIe devices 113 connected to the PCIe switch 109 have been assigned different trust identifiers 123 associated with separate virtual machines 119 (e.g., a second PCIe device 113 being assigned a second trust identifier 123 and a third PCIe device 113 being assigned a third trust identifier 123), then this can indicate that there are PCIe devices 113 assigned to different virtual machines 119 connected to the PCIe switch 109. In this situation, the process would proceed to block 713. However, if the remaining PCIe devices 113 connected to the PCIe switch 109 have been assigned to the same trust identifier 123 and/or the default trust identifier 123, then this can indicate that the PCIe devices connect to the PCIe switch 109 are part of the same trusted domain and/or are assigned to the same virtual machine 119. In this situation, the process could proceed to block 719.

If the process proceeds to block 713, then the hypervisor 116 can set the ACS direct translated bit of the PCIe switch 109 to a disabled state to prevent direct communication between PCIe devices 113 connected to the PCIe switch 109. If the ACS direct translated bit of the PCIe switch 109 is already disabled (e.g., because it was previously disabled by the hypervisor 116), then the hypervisor 116 could proceed directly to block 719.

Subsequently, at block 719, the hypervisor 116 can complete the deregistration process of the PCIe device 113 that was hot removed from the virtual machine 119.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, and a Peripheral Component Interconnect Express (PCIe) switch; and
machine-readable instructions stored in the memory that, when executed by the processor, cause the computing device to at least:
assign a first trust identifier to a first virtual machine hosted by the computing device;
assign the first trust identifier to a first PCIe device assigned to the first virtual machine;
determine that a second PCIe device connected to the PCIe switch is assigned a second trust identifier assigned to a second virtual machine; and
disable an Address Control Services (ACS) direct translated bit for peer-to-peer memory requests in the PCIe switch in response to a determination that the second PCIe device is associated with the second trust identifier assigned to the second virtual machine.

2. The system of claim 1, wherein the machine-readable instructions further cause the computing device to at least:
power off the first virtual machine;
assign a default trust identifier to the first PCIe device in response to the power off of the virtual machine;
determine that each PCIe device connected to the PCIe switch is assigned either the default trust identifier or the second trust identifier; and
enable the ACS direct translated bit for peer-to-peer memory requests in the PCIe switch in response to a determination that the each PCIe device connected to the PCIe switch is assigned either the default trust identifier or the second trust identifier.

3. The system of claim 1, wherein the machine-readable instructions further cause the computing device to at least:
power off the first virtual machine;
assign a default trust identifier to the first PCIe device in response to the power off of the virtual machine;
determine that a third PCIe device connected to the PCIe switch is assigned the first trust identifier;
in response to a determination that the third PCIe device is assigned the first trust identifier, determine that that third PCIe device has Address Translation Services (ATS) enabled;
in response to a determination that the third PCIe device has ATS enabled, determine that the ACS direct translated bit for peer-to-peer memory requests in the PCIe switch is currently enabled; and
disable the ACS direct translated bit for peer-to-peer memory requests in the PCIe switch.

4. The system of claim 1, wherein the machine-readable instructions further cause the computing device to at least:

detect that the first PCIe device has been unassigned from the first virtual machine;
assign a default trust identifier to the first PCIe device in response to the first PCIe device being unassigned from the first virtual machine;
determine that each PCIe device connected to the PCIe switch is assigned either the default trust identifier or the second trust identifier; and
enable the ACS direct translated bit for peer-to-peer memory requests in the PCIe switch in response to a determination that the each PCIe device connected to the PCIe switch is assigned either the default trust identifier or the second trust identifier.

5. The system of claim 1, wherein the machine-readable instructions further cause the computing device to at least:
detect that the first PCIe device has been unassigned from the first virtual machine;
assign a default trust identifier to the first PCIe device in response to the first PCIe device being unassigned from the first virtual machine;
determine that a third PCIe device connected to the PCIe switch is assigned the first trust identifier;
in response to a determination that the third PCIe device is assigned the first trust identifier, determine that that third PCIe device has Address Translation Services (ATS) enabled;
in response to a determination that the third PCIe device has ATS enabled, determine that the ACS direct translated bit for peer-to-peer memory requests in the PCIe switch is currently enabled; and
disable the ACS direct translated bit for peer-to-peer memory requests in the PCIe switch.

6. The system of claim 1, wherein the machine-readable instructions further cause the computing device to at least:
detect that a third PCIe device has been assigned to the first virtual machine;
assign the first trust identifier to the third PCIe device;
determine that each PCIe device connected to the PCIe switch is assigned the first trust identifier; and
enable an Address Control Services (ACS) direct translated bit for peer-to-peer memory requests in the PCIe switch in response a determination that each PCIe device connected to the PCIe switch is assigned the first trust identifier.

7. The system of claim 1, wherein assignment of the first trust identifier to the first virtual machine and the first PCIe device occurs in response to the first virtual machine being powered on.

8. A method, comprising:
assign a first trust identifier to a first virtual machine hosted by a computing device, the computing device comprising a Peripheral Component Interconnect Express (PCIe) switch;
assigning the first trust identifier to a first PCIe device assigned to the first virtual machine;
determining that a second PCIe device connected to the PCIe switch is assigned a second trust identifier assigned to a second virtual machine; and
disabling an Address Control Services (ACS) direct translated bit for peer-to-peer memory requests in the PCIe switch in response to a determination that the second PCIe device is associated with the second trust identifier assigned to the second virtual machine.

9. The method of claim 8, further comprising:
powering off the first virtual machine;
assigning a default trust identifier to the first PCIe device in response to the power off of the virtual machine;
determining that each PCIe device connected to the PCIe switch is assigned either the default trust identifier or the second trust identifier; and
enabling the ACS direct translated bit for peer-to-peer memory requests in the PCIe switch in response to a determination that the each PCIe device connected to the PCIe switch is assigned either the default trust identifier or the second trust identifier.

10. The method of claim 8, further comprising:
powering off the first virtual machine;
assigning a default trust identifier to the first PCIe device in response to the power off of the virtual machine;
determining that a third PCIe device connected to the PCIe switch is assigned the first trust identifier;
in response to determining that the third PCIe device is assigned the first trust identifier, determining that that third PCIe device has Address Translation Services (ATS) enabled;
in response to determining that the third PCIe device has ATS enabled, determining that the ACS direct translated bit for peer-to-peer memory requests in the PCIe switch is currently enabled; and
disabling the ACS direct translated bit for peer-to-peer memory requests in the PCIe switch.

11. The method of claim 8, further comprising:
detecting that the first PCIe device has been unassigned from the first virtual machine;
assigning a default trust identifier to the first PCIe device in response to the first PCIe device being unassigned from the first virtual machine;
determining that each PCIe device connected to the PCIe switch is assigned either the default trust identifier or the second trust identifier; and
enabling the ACS direct translated bit for peer-to-peer memory requests in the PCIe switch in response to a determination that the each PCIe device connected to the PCIe switch is assigned either the default trust identifier or the second trust identifier.

12. The method of claim 8, further comprising:
detecting that the first PCIe device has been unassigned from the first virtual machine;
assigning a default trust identifier to the first PCIe device in response to the first PCIe device being unassigned from the first virtual machine;
determining that a third PCIe device connected to the PCIe switch is assigned the first trust identifier;
in response to determining that the third PCIe device is assigned the first trust identifier, determining that that third PCIe device has Address Translation Services (ATS) enabled;
in response to determining that the third PCIe device has ATS enabled, determining that the ACS direct translated bit for peer-to-peer memory requests in the PCIe switch is currently enabled; and
disabling the ACS direct translated bit for peer-to-peer memory requests in the PCIe switch.

13. The method of claim 8, further comprising:
detecting that a third PCIe device has been assigned to the first virtual machine;
assigning the first trust identifier to the third PCIe device;
determining that each PCIe device connected to the PCIe switch is assigned the first trust identifier; and
enabling an Address Control Services (ACS) direct translated bit for peer-to-peer memory requests in the PCIe switch in response a determination that each PCIe device connected to the PCIe switch is assigned the first trust identifier.

14. The method of claim 8, wherein assigning of the first trust identifier to the first virtual machine and the first PCIe device occurs in response to the first virtual machine being powered on.

15. A non-transitory, computer-readable medium, comprising machine-readable instructions that, when executed by a processor of a computing device, cause the computing device to at least:
assign a first trust identifier to a first virtual machine hosted by the computing device;
assign the first trust identifier to a first PCIe device assigned to the first virtual machine;
determine that a second PCIe device connected to the PCIe switch is assigned a second trust identifier assigned to a second virtual machine; and
disable an Address Control Services (ACS) direct translated bit for peer-to-peer memory requests in the PCIe switch in response to a determination that the second PCIe device is associated with the second trust identifier assigned to the second virtual machine.

16. The non-transitory, computer-readable medium of claim 15, wherein the machine-readable instructions further cause the computing device to at least:
power off the first virtual machine;
assign a default trust identifier to the first PCIe device in response to the power off of the virtual machine;
determine that each PCIe device connected to the PCIe switch is assigned either the default trust identifier or the second trust identifier; and
enable the ACS direct translated bit for peer-to-peer memory requests in the PCIe switch in response to a determination that the each PCIe device connected to the PCIe switch is assigned either the default trust identifier or the second trust identifier.

17. The non-transitory, computer-readable medium of claim 15, wherein the machine-readable instructions further cause the computing device to at least:
power off the first virtual machine;
assign a default trust identifier to the first PCIe device in response to the power off of the virtual machine;
determine that a third PCIe device connected to the PCIe switch is assigned the first trust identifier;
in response to a determination that the third PCIe device is assigned the first trust identifier, determine that that third PCIe device has Address Translation Services (ATS) enabled;
in response to a determination that the third PCIe device has ATS enabled, determine that the ACS direct translated bit for peer-to-peer memory requests in the PCIe switch is currently enabled; and
disable the ACS direct translated bit for peer-to-peer memory requests in the PCIe switch.

18. The non-transitory, computer-readable medium of claim 15, wherein the machine-readable instructions further cause the computing device to at least:
detect that the first PCIe device has been unassigned from the first virtual machine;
assign a default trust identifier to the first PCIe device in response to the first PCIe device being unassigned from the first virtual machine;
determine that each PCIe device connected to the PCIe switch is assigned either the default trust identifier or the second trust identifier; and
enable the ACS direct translated bit for peer-to-peer memory requests in the PCIe switch in response to a determination that the each PCIe device connected to the PCIe switch is assigned either the default trust identifier or the second trust identifier.

19. The non-transitory, computer-readable medium of claim 15, wherein the machine-readable instructions further cause the computing device to at least:
detect that the first PCIe device has been unassigned from the first virtual machine;
assign a default trust identifier to the first PCIe device in response to the first PCIe device being unassigned from the first virtual machine;
determine that a third PCIe device connected to the PCIe switch is assigned the first trust identifier;
in response to a determination that the third PCIe device is assigned the first trust identifier, determine that that third PCIe device has Address Translation Services (ATS) enabled;
in response to a determination that the third PCIe device has ATS enabled, determine that the ACS direct translated bit for peer-to-peer memory requests in the PCIe switch is currently enabled; and
disable the ACS direct translated bit for peer-to-peer memory requests in the PCIe switch.

20. The non-transitory, computer-readable medium of claim 15, wherein the machine-readable instructions further cause the computing device to at least:
detect that a third PCIe device has been assigned to the first virtual machine;
assign the first trust identifier to the third PCIe device;
determine that each PCIe device connected to the PCIe switch is assigned the first trust identifier; and
enable an Address Control Services (ACS) direct translated bit for peer-to-peer memory requests in the PCIe switch in response a determination that each PCIe device connected to the PCIe switch is assigned the first trust identifier.

* * * * *